(12) United States Patent
Seo et al.

(10) Patent No.: US 12,176,151 B2
(45) Date of Patent: Dec. 24, 2024

(54) MULTILAYER CAPACITOR

(71) Applicant: SAMSUNG ELECTRO-MECHANICS CO., LTD., Suwon-si (KR)

(72) Inventors: Jeong Wook Seo, Suwon-si (KR); Hee Sun Chun, Suwon-si (KR); Tae Hyung Kim, Suwon-si (KR); Hui Sun Park, Suwon-si (KR); Hyeg Soon An, Suwon-si (KR); Hyo Ju Lee, Suwon-si (KR); Jin Woo Kim, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 455 days.

(21) Appl. No.: 17/570,576

(22) Filed: Jan. 7, 2022

(65) Prior Publication Data

US 2023/0130377 A1     Apr. 27, 2023

(30) Foreign Application Priority Data

Oct. 22, 2021  (KR) .................. 10-2021-0141711

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

| | | | |
|---|---|---|---|
| 2017/0040111 A1* | 2/2017 | Kim ..................... | H01G 4/224 |
| 2019/0115153 A1 | 4/2019 | Park et al. | |
| 2019/0180936 A1* | 6/2019 | Cha ....................... | C04B 35/47 |

(Continued)

FOREIGN PATENT DOCUMENTS

| | | |
|---|---|---|
| KR | 10-2019-0041846 A | 4/2019 |
| KR | 10-2019-0121132 A | 10/2019 |
| KR | 10-2283078 B1 | 7/2021 |

*Primary Examiner* — Nathan Milakovich
(74) *Attorney, Agent, or Firm* — MORGAN, LEWIS & BOCKIUS LLP

(57) ABSTRACT

A multilayer capacitor includes a body including a laminate structure in which at least one first internal electrode and at least one second internal electrode are alternately stacked in a first direction with at least one dielectric layer therebetween, and first and second external electrodes spaced apart on the body, to be connected to at least one first internal electrode and at least one second internal electrode, respectively. The body includes, in a larger molar content, at least one selected from the group consisting of Dy, Tb, Y, Sm, Ho, Gd, Er, Ce, La and Nd in a capacitance formation region including a region between at least one first internal electrode and at least one second internal electrode than in a margin region including a region between a boundary line of at least one first internal electrode and at least one second internal electrode and a surface of the body.

26 Claims, 11 Drawing Sheets

(56) References Cited

U.S. PATENT DOCUMENTS

| | | | |
|---|---|---|---|
| 2019/0355519 A1* | 11/2019 | Taniguchi | H01G 4/232 |
| 2020/0035415 A1 | 1/2020 | Kwon et al. | |
| 2021/0074479 A1* | 3/2021 | Lee | H01G 4/30 |
| 2021/0272755 A1* | 9/2021 | Kato | B32B 18/00 |
| 2022/0230809 A1* | 7/2022 | Chun | H01G 4/30 |
| 2023/0126670 A1* | 4/2023 | Kim | H01G 4/248 361/301.4 |
| 2023/0207212 A1* | 6/2023 | Jeon | H01G 4/30 361/306.3 |

\* cited by examiner

MULTILAYER CAPACITOR

CROSS-REFERENCE TO RELATED APPLICATIONS

This application claims benefit under 35 USC 119(a) of Korean Patent Application No. 10-2021-0141711 filed on Oct. 22, 2021 in the Korean Intellectual Property Office, the entire disclosure of which is incorporated herein by reference for all purposes.

TECHNICAL FIELD

The present disclosure relates to a multilayer capacitor.

BACKGROUND

Multilayer capacitors are widely used as components for electronic devices such as computers, PDAs, and mobile phones, due to the small size, high capacitance, and ease in mounting thereof, and are widely used as parts for electrical devices (including vehicles) due to high reliability and high strength characteristics thereof.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor in which overall performance (e.g., at least one of withstand voltage, reliability, capacitance, and miniaturization) may be improved.

According to an aspect of the present disclosure, a multilayer capacitor includes a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively. The body includes, in a larger molar content, at least one selected from the group consisting of one or more of Dy, Tb, Y, Sm, Ho, Gd, Er, Ce, La and Nd in a capacitance formation region including a region between the at least one first internal electrode and the at least one second internal electrode than in a margin region including a region between a boundary line of the at least one first internal electrode and the at least one second internal electrode and a surface of the body.

In some embodiments, the body may further include a $BaTiO_3$-based main component. In the body, a grain size of a dielectric in a region within 2 μm from between the capacitance formation region and the margin region toward the surface of the body may be shorter than a grain size of a dielectric in the capacitance formation region.

In some embodiments, the body may include more dysprosium (Dy) in the capacitance formation region than in the margin region.

In some embodiments, the body may further include more tin (Sn) in the margin region than in the capacitance formation region.

In some embodiments, the body may further include tin (Sn). A sum of a molar content of at least one selected from the group consisting of one or more of Dy, Tb, Y, Sm, Ho, Gd, Er, Ce, La and Nd and a molar content of tin (Sn) may be greater in the margin region than in the capacitance formation region.

In some embodiments, the body may include dysprosium (Dy). A sum of a molar content of dysprosium (Dy) and a molar content of tin (Sn) may be greater by 100/65 times or more and 100/55 times or less in the margin region than in the capacitance formation region.

In some embodiments, the body may further include at least one selected from the group consisting of one or more of magnesium (Mg) and aluminum (Al). A total molar content of magnesium (Mg) and aluminum (Al) may be greater in the margin region than in the capacitance formation region.

In some embodiments, the total molar content of magnesium (Mg) and aluminum (Al) may be greater by 100/50 times or more and 100/45 times or less in the margin region than in the capacitance formation region.

In some embodiments, the body may further include a second accessory component including at least one selected from the group consisting of one or more of tin (Sn), magnesium (Mg) and aluminum (Al), the at least one selected from the group consisting of one or more of Dy, Tb, Y, Sm, Ho, Gd, Er, Ce, La and Nd may be a first accessory component, and a ratio of a molar content of the first accessory component to a molar content of the second accessory component may be higher in the capacitance formation region than in the margin region.

According to an aspect of the present disclosure, a multilayer capacitor includes a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively. The body includes a first accessory component including at least one selected from the group consisting of one or more of Dy, Tb, Y, Sm, Ho, Gd, Er, Ce, La and Nd, and a second accessory component including at least one selected from the group consisting of one or more of tin (Sn), magnesium (Mg) and aluminum (Al). A ratio of a molar content of the first accessory component to a molar content of the second accessory component is higher in a capacitance formation region including a region between the at least one first internal electrode and the at least one second internal electrode than in a margin region including a region between a boundary line of the at least one first internal electrode and the at least one second internal electrode and a surface of the body.

In some embodiments, the body may include dysprosium (Dy). A ratio of a molar content of dysprosium (Dy) to the molar content of the second accessory component may be higher in the capacitance formation region than in the margin region.

In some embodiments, the ratio of the molar content of dysprosium (Dy) to the molar content of the second accessory component may be higher by 1.6 times or more and 10/3 times or less in the capacitance formation region than in the margin region.

In some embodiments, the ratio of the molar content of dysprosium (Dy) to the molar content of the second accessory component may be 0.4 or more and 0.5 or less in the capacitance formation region, and may be 0.15 or more and 0.25 or less in the margin region.

In some embodiments, a total molar content of magnesium (Mg) and aluminum (Al) may be greater in the margin region than in the capacitance formation region.

In some embodiments, the total molar content of magnesium (Mg) and aluminum (Al) may be greater by 100/50 times or more and 100/45 times or less in the margin region than in the capacitance formation region.

In some embodiments, the body may further include tin (Sn). A sum of the molar content of the first accessory component and a molar content of tin (Sn) may be greater in the margin region than in the capacitance formation region.

In some embodiments, the body may include dysprosium (Dy). A sum of a molar content of dysprosium (Dy) and the molar content of tin (Sn) may be greater by 100/65 times or more and 100/55 times or less in the margin region than in the capacitance formation region.

In some embodiments, the body may further include a BaTiO3-based main component. In the body, a grain size of a dielectric in a region within 2 μm from between the capacitance formation region and the margin region toward the surface of the body may be shorter than a grain size of a dielectric in the capacitance formation region.

According to an aspect of the present disclosure, a multilayer capacitor includes a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively. The body includes a first accessory component including dysprosium (Dy) and optionally at least one selected from the group consisting of one or more of Tb, Y, Sm, Ho, Gd, Er, Ce, La and Nd, and a second accessory component including tin (Sn), magnesium (Mg), and aluminum (Al). A ratio of a molar content of dysprosium (Dy) to a molar content of the second accessory component is higher in a capacitance formation region including a region between the at least one first internal electrode and the at least one second internal electrode than in a margin region including a region between a boundary line of the at least one first internal electrode and the at least one second internal electrode and a surface of the body.

In some embodiments, the ratio of the molar content of dysprosium (Dy) to the molar content of the second accessory component may be 0.4 or more and 0.5 or less in the capacitance formation region.

In some embodiments, the ratio of the molar content of dysprosium (Dy) to the molar content of the second accessory component may be 0.15 or more and 0.25 or less in the margin region.

In some embodiments, the second accessory component may consist of tin (Sn), magnesium (Mg), and aluminum (Al).

According to an aspect of the present disclosure, a multilayer capacitor includes a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively. The body includes a first accessory component including dysprosium (Dy) and optionally at least one selected from the group consisting of one or more of Tb, Y, Sm, Ho, Gd, Er, Ce, La and Nd, and a second accessory component including tin (Sn), magnesium (Mg), and aluminum (Al). A total molar content of magnesium (Mg) and aluminum (Al) is greater in a margin region including a region between a boundary line of the at least one first internal electrode and the at least one second internal electrode and a surface of the body than in a capacitance formation region including a region between the at least one first internal electrode and the at least one second internal electrode. A sum of a molar content of dysprosium (Dy) and the molar content of tin (Sn) is greater in the margin region than in the capacitance formation region.

In some embodiments, the total molar content of magnesium (Mg) and aluminum (Al) may be greater by 100/50 times or more and 100/45 times or less in the margin region than in the capacitance formation region.

In some embodiments, the sum of the molar content of dysprosium (Dy) and the molar content of tin (Sn) may be greater by 100/65 times or more and 100/55 times or less in the margin region than in the capacitance formation region.

In some embodiments, the second accessory component may consist of tin (Sn), magnesium (Mg), and aluminum (Al).

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
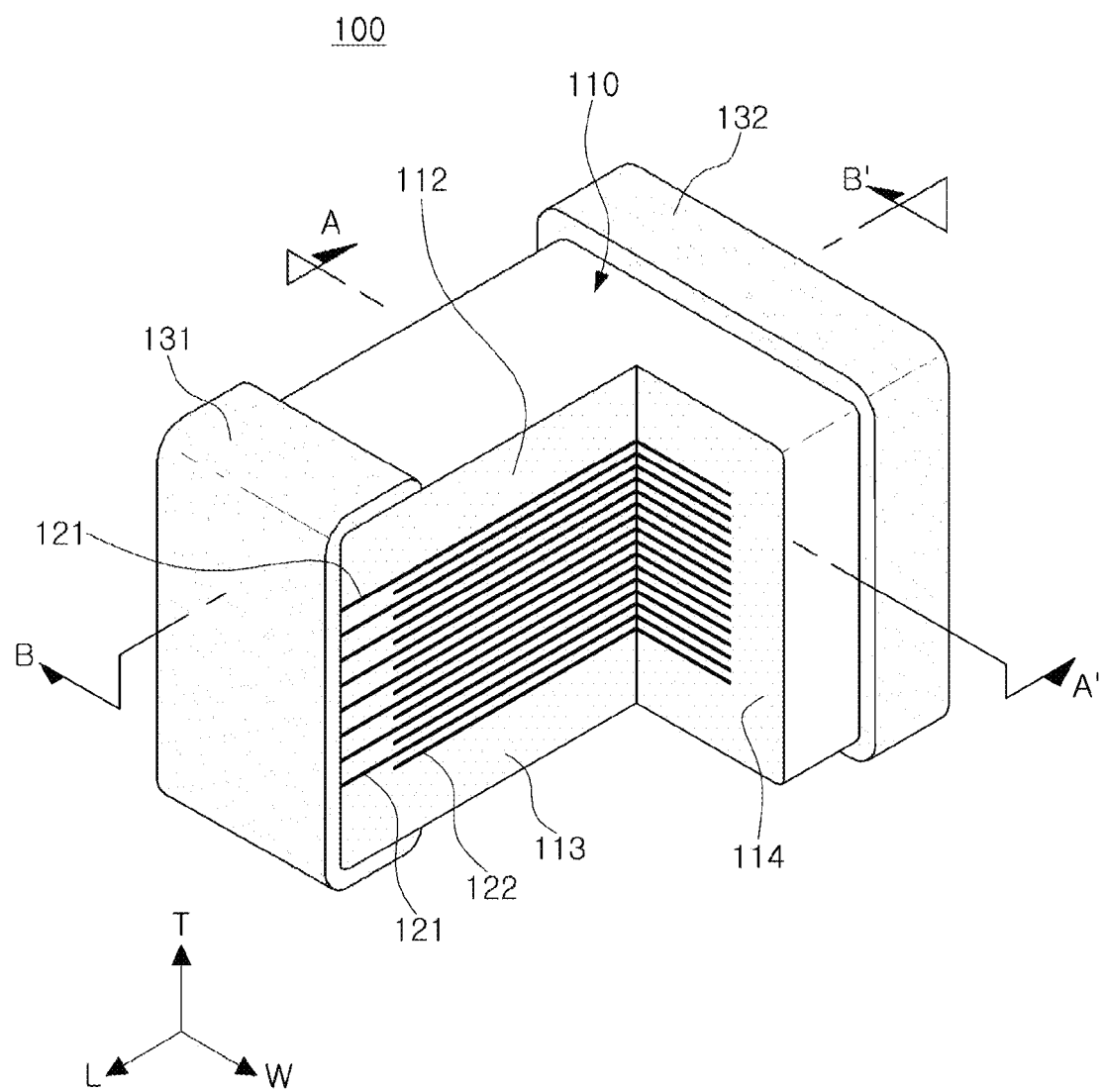
FIG. 1 is a perspective view illustrating a multilayer capacitor according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

When the direction of the parallelepiped is defined to clearly describe the embodiments of the present disclosure, L, W, and T indicated in the drawings represent a length direction, a width direction, and a thickness direction, respectively. In this case, the thickness direction may be used as the same concept as the stacking direction in which the dielectric layers are stacked.

Hereinafter, a multilayer capacitor according to an embodiment will be described, and in detail, a multilayer ceramic capacitor will be described, but the present disclosure is not limited thereto.

Figure 2:
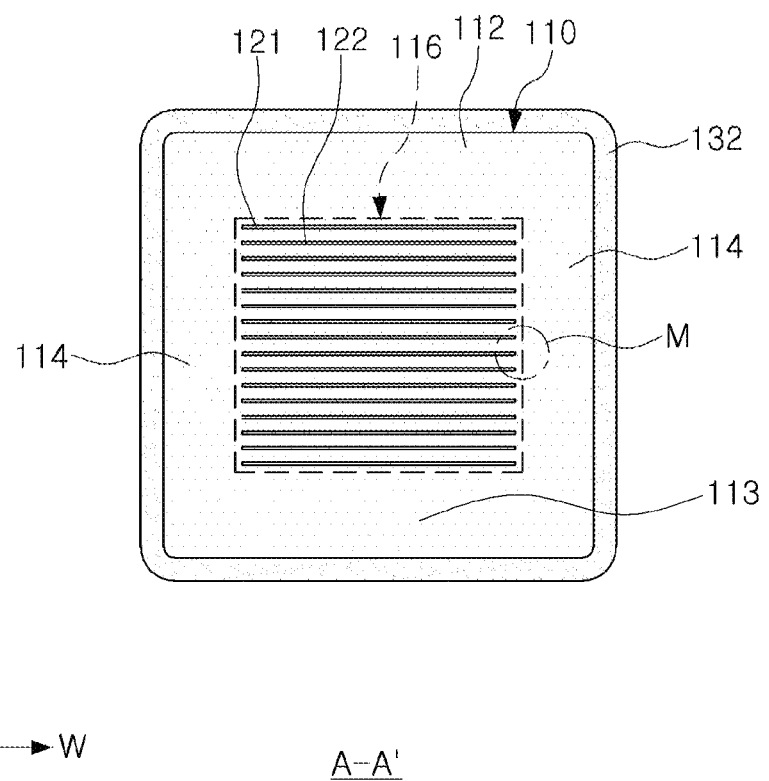
FIG. 2 is a cross-sectional view taken along line A-A' of FIG. 1.
Figure 3:
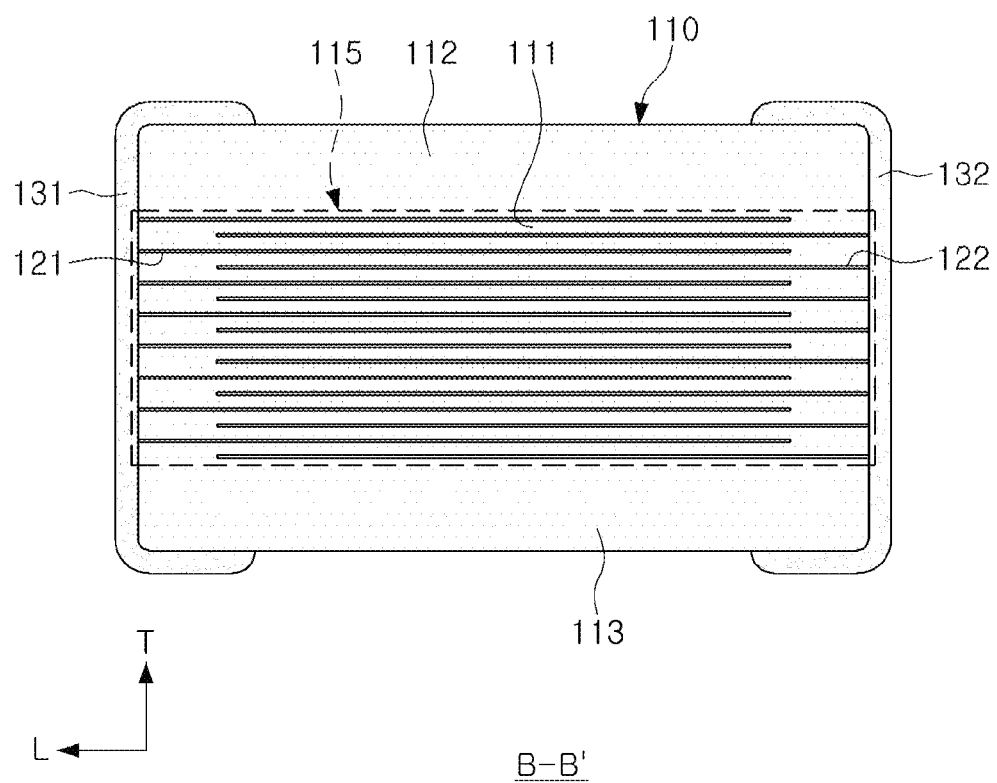
FIG. 3 is a cross-sectional view taken along line B-B' of FIG. 1.

FIG. 1 is a perspective view illustrating a multilayer capacitor according to an embodiment, FIG. 2 is a cross-sectional view taken along line A-A' of FIG. 1, and FIG. 3 is a cross-sectional view taken along line B-B' of FIG. 1.

Referring to FIGS. 1, 2 and 3, a multilayer capacitor 100 according to an embodiment may include a body 110, a first external electrode 131, and a second external electrode 132. Although FIG. 1 illustrates a shape cut by about ¼ of the total volume thereof to show the inside of the body 110, the actual multilayer capacitor 100 may not be cut by about ¼ of the volume thereof, and may have an approximately symmetrical form with respect to the respective directions of the L direction, the W direction, and the T direction from the center.

The body 110 may have a laminate structure in which at least one first internal electrode 121 and at least one second internal electrode 122 are alternately stacked in a first direction (e.g., the T direction) with at least one dielectric layer 111 interposed therebetween.

For example, the body 110 may be formed of a ceramic body by sintering the laminate structure. In this case, at least one or more dielectric layers 111 disposed in the body 110 is in a sintered state, and the boundary between adjacent dielectric layers may be integrated to the extent that it is difficult to check without using a scanning electron microscope (SEM).

For example, the body 110 may be formed of a hexahedron having both sides in the length direction (L), both sides in the width direction (W), and both sides in the thickness direction (T), and the edges and corners of the hexahedron may be rounded as they are polished. However, the shape and size of the body 110 and the number of stacked dielectric layers 111 are not limited to those illustrated in the present embodiment.

The thickness of the at least one dielectric layer 111 may be arbitrarily changed according to the capacitance design of the multilayer capacitor 100, and may include a ceramic powder having a high dielectric constant, for example, a barium titanate ($BaTiO_3$)-based powder. The present disclosure is not limited thereto. In addition, various ceramic additives (e.g., MgO, $Al_2O_3$, $SiO_2$, ZnO), organic solvents, plasticizers, binders, dispersants, or the like may be added to the ceramic powder according to the required specifications of the multilayer capacitor 100.

The average particle diameter of the ceramic powder used to form the at least one dielectric layer 111 is not particularly limited, and may be adjusted according to the required standard of the multilayer capacitor 100 (e.g., miniaturization and/or high capacitance such as a capacitor for electronic devices, or high withstand voltage characteristics and/or strong strength such as a capacitor for electrical devices), but may be adjusted to, for example, 400 nm or less.

For example, the at least one dielectric layer 111 may be formed by applying and drying a slurry formed including powder such as barium titanate ($BaTiO_3$) on a carrier film and thus providing a plurality of ceramic sheets. The ceramic sheet may be formed by preparing a slurry by mixing ceramic powder, a binder, and a solvent, and preparing the slurry in a sheet shape having a thickness of several μm by a doctor blade method, but the formation method is not limited thereto.

The at least one first internal electrode 121 and the at least one second internal electrode 122 may be formed by printing a conductive paste including a conductive metal, to be alternately exposed to one side and the other side of the body 110 in the direction L, in the stacking direction (e.g., the T direction) of the dielectric layers. The at least one first internal electrode 121 and the at least one second internal electrode 122 may be electrically insulated from each other by a dielectric layer interposed therebetween.

For example, each of the at least one first internal electrode 121 and the at least one second internal electrode 122 may be formed of a conductive paste for an internal electrode, having an average particle size of 0.1 to 0.2 μm and having 40 to 50% by weight, but the material is not limited thereto. The conductive paste may be one of nickel (Ni), copper (Cu), palladium (Pd), silver (Ag), lead (Pb) or platinum (Pt) alone, or alloys thereof, but is not limited thereto.

For example, an internal electrode pattern may be formed by coating the internal electrode conductive paste on the ceramic sheet by a printing method or the like. As the method of printing the conductive paste, a screen-printing method, a gravure printing method, an inkjet printing method, or the like may be used, but the present disclosure is not limited thereto. For example, the body 110 may be manufactured by laminating 200 to 300 layers of the ceramic sheet on which the internal electrode pattern is printed, pressing, and sintering the same.

The capacitance of the multilayer capacitor 100 may be proportional to an overlapping area of the first internal electrodes 121 and the second internal electrodes 122 in the stacking direction (e.g., in the T direction), be proportional to the total number of stacking of the internal electrodes 121 and the second internal electrodes 122, and be inversely proportional to the distance between the at least one first internal electrode 121 and the at least one second internal electrode 122. The distance may be substantially equal to the thickness of the at least one dielectric layer 111.

The multilayer capacitor 100 may have a relatively greater capacitance compared to the thickness, as the distance between the at least one first internal electrode 121 and the at least one second internal electrode 122 decreases. On the other hand, the withstand voltage of the multilayer capacitor 100 may be increased as the distance increases. Accordingly, the distance may be adjusted according to the required standard of the multilayer capacitor 100 (e.g., the requirement for miniaturization and/or high capacitance such as in a capacitor for electronic devices, or the requirement for high withstand voltage characteristics and/or strong strength such as in a capacitor for an electric device). The thickness of each of the at least one first internal electrode 121 and the at least one second internal electrode 122 may also be affected by the distance.

For example, in the multilayer capacitor 100, when relatively high withstand voltage characteristics and/or strong strength are required, the distance between the at least one first internal electrode 121 and the at least one second internal electrode 122 may be designed to exceed twice each thickness. For example, when miniaturization and/or high capacity are required, the multilayer capacitor 100 may be designed such that each of the first internal electrode 121 and the second internal electrode 122 has a thickness of 0.4 μm or less and the total number of stacks thereof is 400 or more.

The first and second external electrodes 131 and 132 may be disposed on the body 110 to be spaced apart from each other to be connected to the at least one first internal electrode 121 and the at least one second internal electrode 122, respectively.

For example, the first and second external electrodes 131 and 132 may be respectively formed by a method of dipping in a paste containing a metal component, a method of printing a conductive paste, a sheet transfer method, a pad transfer method, sputter plating, electrolytic plating, or the like. For example, the first and second external electrodes 131 and 132 may include a sintered layer formed as the paste is sintered, and a plating layer formed on an outer surface of the sintered layer, and may further include a conductive resin layer disposed between the sintered layer and the plating layer. For example, the conductive resin layer may be formed as conductive particles are contained in a thermosetting resin such as epoxy. The metal component may be one of copper (Cu), palladium (Pd), platinum (Pt), gold (Au), silver (Ag), lead (Pb), or tin (Sn) alone, or alloys thereof, but is not limited thereto.

The multilayer capacitor 100 may be mounted on or embedded in an external board (e.g., a printed circuit board), connected to at least one of wires, lands, solders and bumps of the external board through the first and second external electrodes 131 and 132, and thus electrically connected to a circuit (e.g., an integrated circuit, a processor) that is electrically connected to the external board.

Referring to FIGS. 1, 2 and 3, the body 110 may include an upper cover layer 112, a lower cover layer 113, and a core region 115, and the core region 115 may include a margin region 114 and a capacitance formation region 116.

The upper and lower cover layers 112 and 113 may be disposed to have the core region 115 interposed therebetween in the first direction (e.g., the T direction) and may each have a thickness greater than each of the at least one dielectric layer 111.

The upper and lower cover layers 112 and 113 may prevent external environmental elements (e.g., moisture, plating solution, foreign substances) from penetrating into the core region 115, protect the body 110 from external impacts, and improve bending strength of the body 110.

For example, the upper and lower cover layers 112 and 113 may include the same material as that of the at least one dielectric layer 111 or a different material (e.g., a thermosetting resin such as an epoxy resin).

Since the capacitance formation region 116 may include a region between the at least one first internal electrode 121 and the at least one second internal electrode 122, the capacitance of the multilayer capacitor 100 may be formed.

The capacitance formation region 116 may have a stacked structure in which at least one first internal electrode 121 and at least one second internal electrode 122 are alternately stacked in a first direction (e.g., the T direction) with at least one dielectric layer 111 interposed therebetween, and may have the same size as the stacked structure.

The margin region 114 may include a region between the boundary line (e.g., the broken line shown in FIG. 2) between the at least one first internal electrode 121 and the at least one second internal electrode 122 and the surface of the body 110.

The plurality of margin regions 114 may be disposed to have the capacitance formation region 116 therebetween, in a second direction (e.g., the W direction) perpendicular to the first direction (e.g., the T direction). For example, the plurality of margin regions 114 may be formed in a manner similar to that of the at least one dielectric layer 111 (a stacking direction is different).

The plurality of margin regions 114 may prevent the at least one first internal electrode 121 and the at least one second internal electrode 122 from being exposed from the body 110 to the surface thereof in the second direction (e.g., the W direction). Therefore, external environmental elements (e.g., moisture, plating solution, foreign substances) may be prevented from penetrating into the at least one first internal electrode 121 and the at least one second internal electrode 122 through the surface of the body in the second direction, and the reliability and lifespan of the multilayer capacitor 100 may be improved. In addition, since the at least one first internal electrode 121 and the at least one second internal electrode 122 may be formed to efficiently expand in the second direction due to the plurality of margin regions 114, the overlapping area of the first internal electrodes 121 and the second internal electrodes 122 may be increased by the plurality of margin regions 114, thereby contributing to an improvement in the capacitance of the multilayer capacitor 100.

Figure 4:
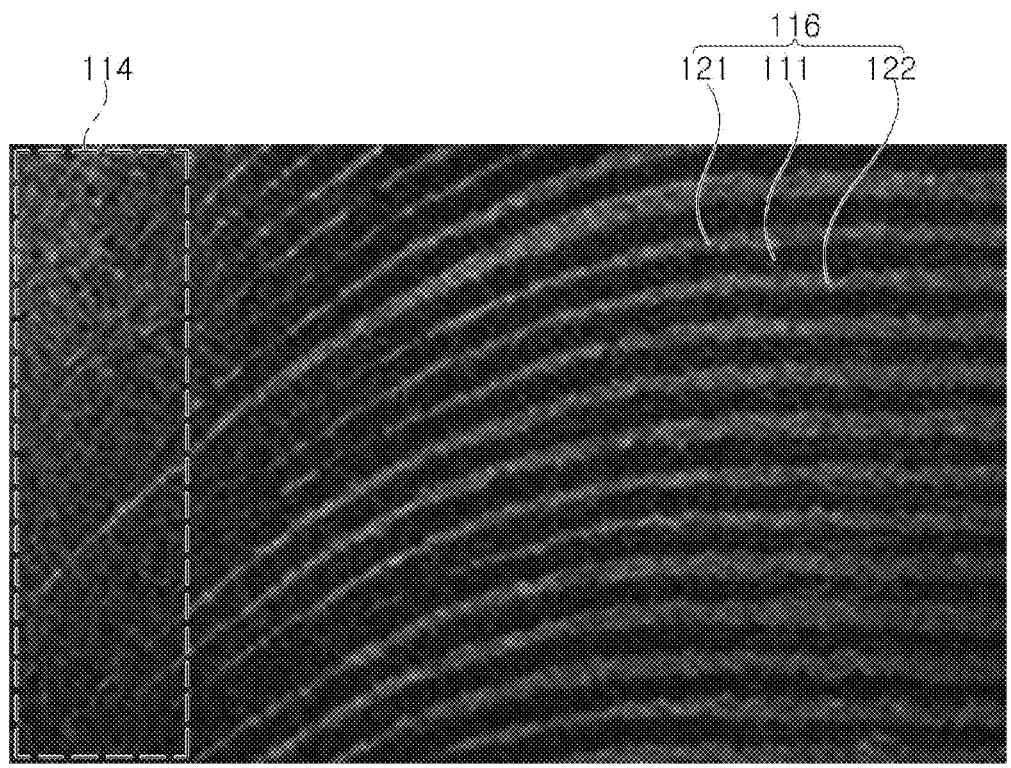
FIG. 4 is an image illustrating a capacitance formation region and a margin region of a multilayer capacitor according to an embodiment.

FIG. 4 is an image illustrating a capacitance formation region and a margin region of a multilayer capacitor according to an embodiment.

Referring to FIG. 4, at least one first internal electrode 121 and at least one second internal electrode 122 in the capacitance formation region 116 of the multilayer capacitor according to an embodiment may be slightly curved closer to the margin region 114.

This bending may be caused by an interaction between the dielectric layer 111 and the margin region 114 due to a step in the capacitance formation region 116 or compression during the manufacturing process, and may become more severe as the total number of stacks in the capacitance formation region 116 increases or the overall area of the internal electrode increases.

This bending is an example of the difference between the capacitance formation region 116 and the margin region 114.

For example, the distance between adjacent internal electrodes may be reduced as it is closer to the margin region 114 from the center of the capacitance formation region 116, and the withstand voltage characteristic of the multilayer capacitor may be relatively most affected by a minimum distance between adjacent internal electrodes. Accordingly, the margin region 114 is configured to be advantageous in the withstand voltage characteristic, compared to the capacitance formation region 116, and thus, the withstand voltage characteristic of the multilayer capacitor may be effectively improved.

As such, the difference between the capacitance formation region 116 and the margin region 114 may affect a sintering imbalance between the dielectric of the capacitance formation region 116 and the dielectric of the margin region 114 when the multilayer capacitor is sintered. During sintering of the multilayer capacitor, the margin region 114 may be closer to the surface of the multilayer capacitor than the capacitance formation region 116, and thus may receive more heat.

For example, if the sintering temperature and/or sintering time are optimized for the capacitance formation region 116, the dielectric of the margin region 114 may be relatively less sintered, and thus, the overall imbalance and/or or an increase in voids in the margin region 114 may be induced. For example, if the sintering temperature and/or sintering time are optimized for the margin region 114, voids in the margin region 114 may be suppressed, but a portion of the capacitance formation region 116 may be vulnerable to electric field concentration due to under-sintering.

Therefore, the multilayer capacitor according to an embodiment of the present disclosure may include a structure capable of offsetting the difference between the capacitance formation region 116 and the margin region 114.

Figure 5:
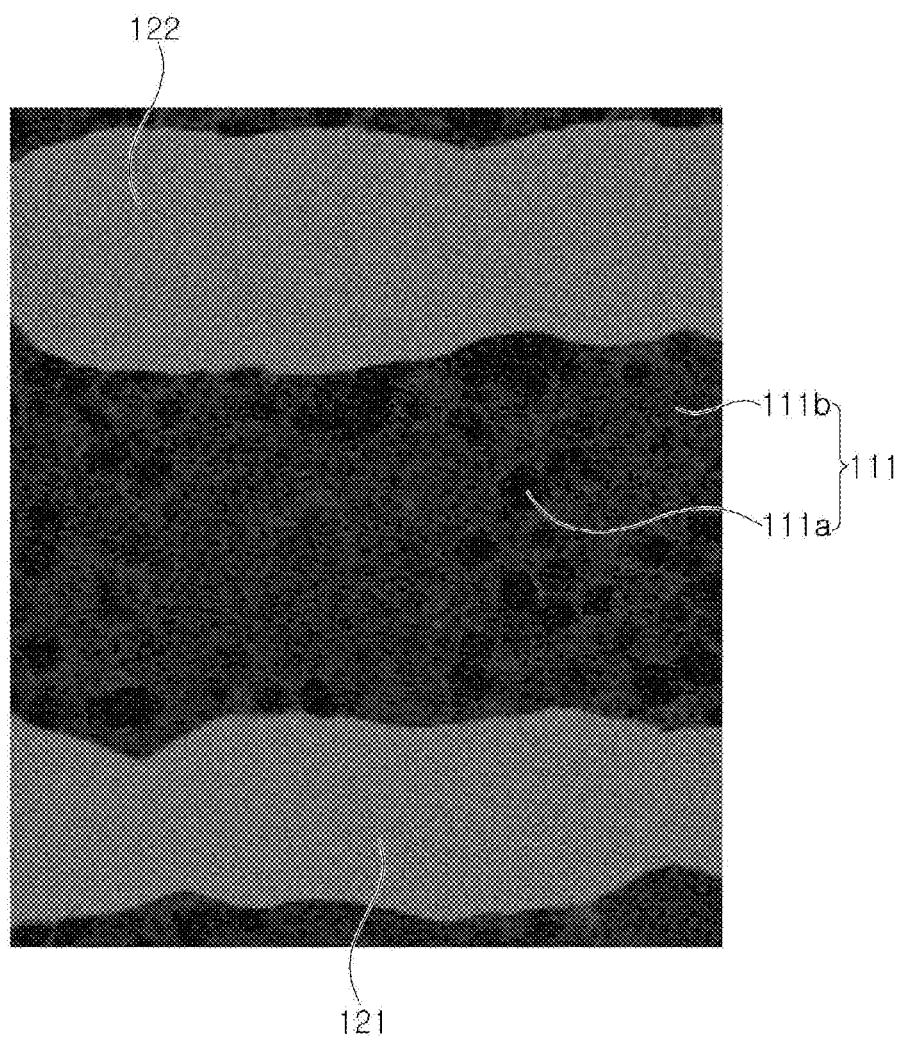
FIG. 5 is an image illustrating a dielectric in a capacitance formation region of a multilayer capacitor according to an embodiment.

FIG. 5 is an image illustrating a dielectric in a capacitance formation region of a multilayer capacitor according to an embodiment.

Referring to FIG. 5, the dielectric layer 111 of the capacitance formation region 116 may have a structure in which the rare earth element 111b, at least a portion of the accessory component, substitutes barium (Ba) of a portion of the $BaTiO_3$-based main component 111a and is solid-solubilized.

In the present specification, the "main component" may indicate a component occupying a relatively large weight ratio compared to other components, and may indicate a component that is 50% by weight or more based on the weight of the entire composition or the entire dielectric layer. In addition, "accessory component" may indicate a component occupying a relatively small weight ratio compared to other components, and may indicate a component that is less than 50% by weight based on the weight of the entire composition or the entire dielectric layer. In addition, the dielectric layer 111 may include various ceramic additives, organic solvents, plasticizers, binders, dispersants, and the like, in addition to the accessory component and the main component of the dielectric. For example, the dielectric composition may include polyvinyl alcohol (PVA), polyvinyl butyral (PVB), an acrylic resin, or the like as a binder.

The rare earth element 111b illustrated in FIG. 5 is dysprosium (Dy), but the rare earth element 111b is not limited to dysprosium (Dy), and may be an element selected from the group consisting of one or more elements among Dy, Tb, Y, Sm, Ho, Gd, Er, Ce, La an Nd.

Since the valence of barium (Ba) is +2, and the rare earth element 111b may generally have a valence of +3 (fixedvalence of +3), a portion of the main component 111a in which the rare earth element 111b is substituted and solid-solubilized may further have single positive charge. Accordingly, as the rare earth element 111b is substituted and solid-solubilized in a portion of the BaTiO$_3$-based main component 111a, the concentration of oxygen (O) vacancies may decrease, and the reliability of the dielectric layer 111 and the multilayer capacitor may be improved.

Figure 6A:
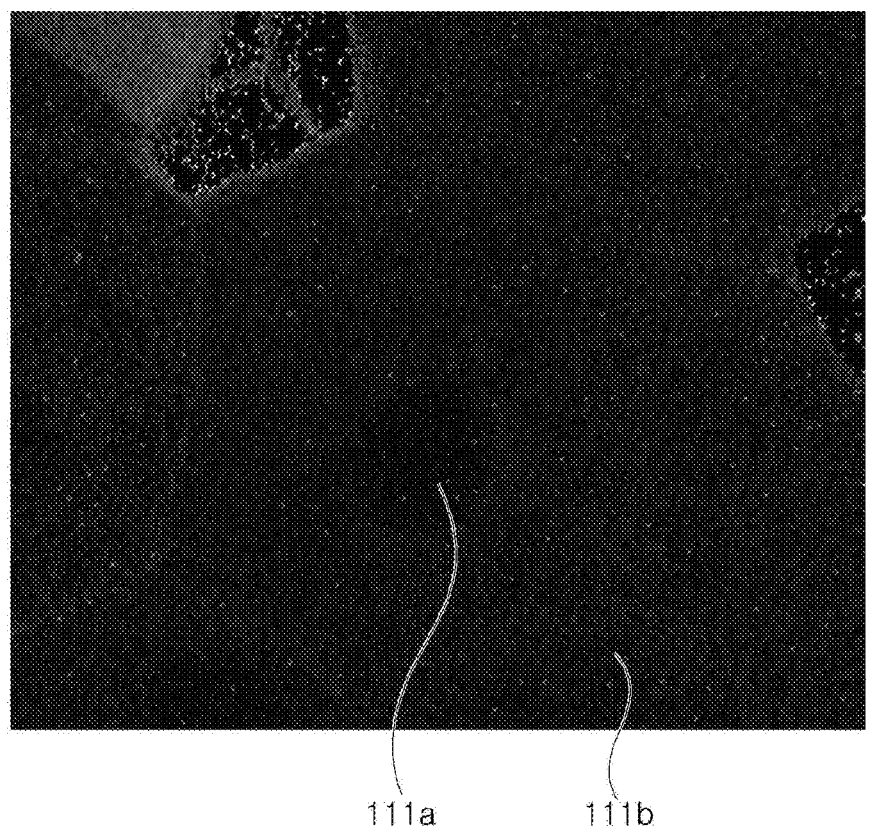
FIGS. 6A and 6B are images illustrating a difference in grain growth of a dielectric of a multilayer capacitor according to an embodiment.
Figure 6B:
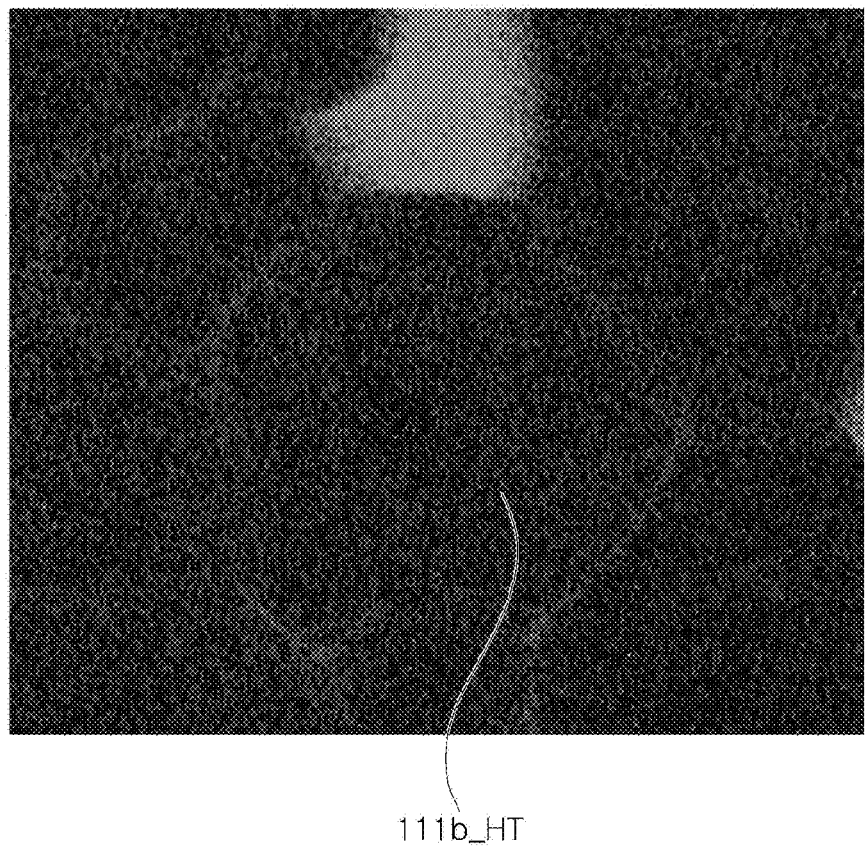

FIGS. 6A and 6B are images illustrating a difference in grain growth of a dielectric of a multilayer capacitor according to an embodiment.

Referring to FIG. 6A, each dielectric of the dielectric layer 111 may have a core-shell structure in which the BaTiO$_3$-based main component 111a is a core and the rare earth element 111b is a shell, and may have a polygonal structure. The grain diameter of each dielectric may be measured as a value obtained by dividing the sum of the longest axis and the shortest axis of each dielectric by two.

Referring to FIG. 6B, a dielectric layer 111_HT formed by increasing the sintering temperature and/or sintering time may not have a core-shell structure as a rare earth element 111b_HT is solid-solubilized in the BaTiO$_3$-based main component more extensively, and the grain diameter of the dielectric may also be smaller than that of FIG. 6A. In this case, when the molar content of the rare earth element 111b_HT is decreased, the characteristics of the dielectric layer 111_HT may be closer to those of the dielectric layer 111 of FIG. 6A.

Accordingly, in the multilayer capacitor according to an embodiment, the difference between the capacitance formation region and the margin region may be offset using the difference in the molar content of one or more rare earth elements among Dy, Tb, Y, Sm, Ho, Gd, Er, Ce, La and Nd.

Throughout the specification, molar content does not distinguish addition forms such as oxides or carbonates. For example, 0.1 mole of V$_2$O$_3$, the oxide of V, may be equal to 0.2 mole of V. For example, the molar content may be measured visually by analysis using at least one of Transmission Electron Microscopy (TEM), Atomic Force Microscope (AFM), Scanning Electron Microscope (SEM), optical microscope, and a surface profiler, may be measured in mass by a relationship between weight and volume, or may be indirectly measured with substances extracted through a chemical reaction.

Figure 7A:
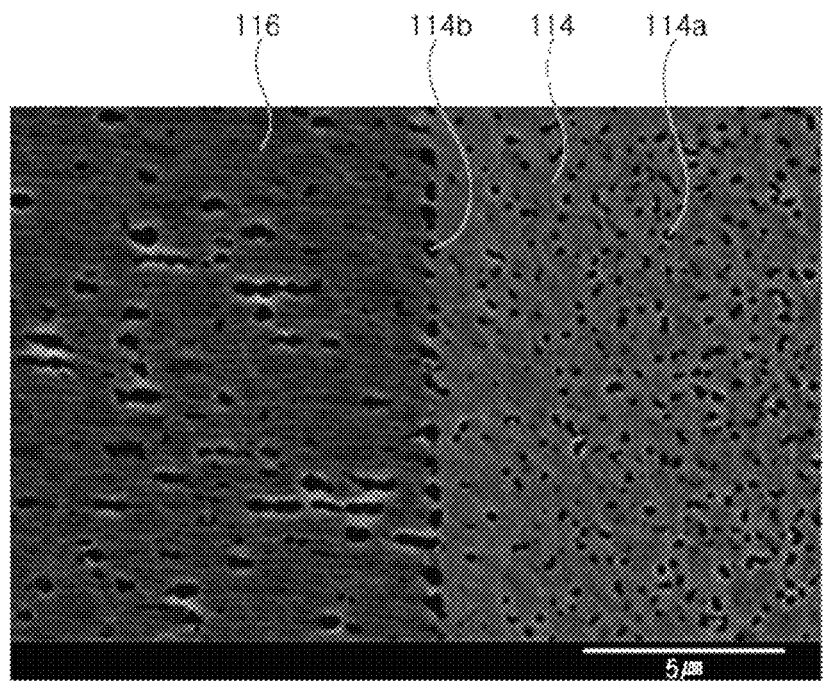
FIG. 7A is an image illustrating microstructures of a capacitance formation region and a margin region of a multilayer capacitor according to an embodiment.
Figure 7B:
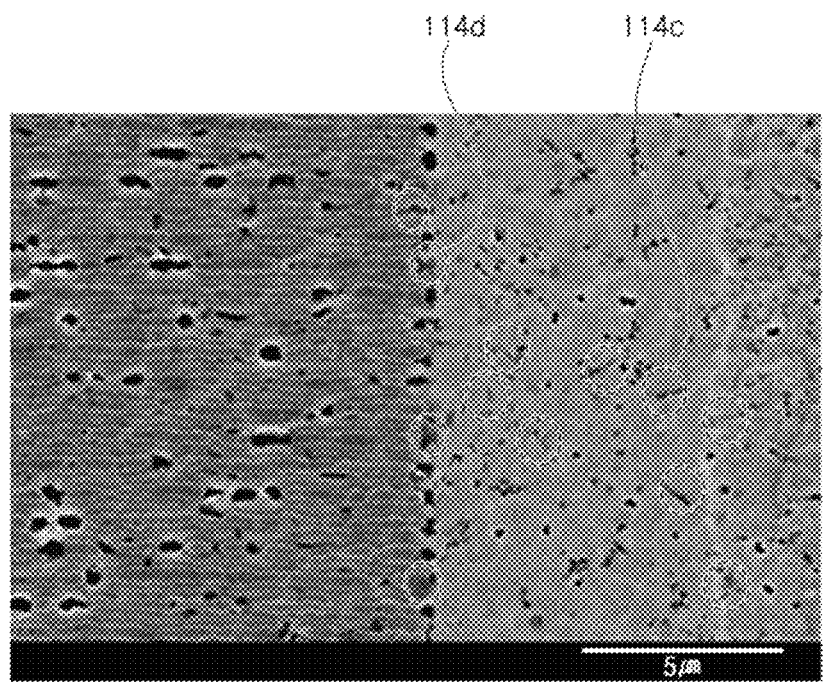
FIG. 7B is an image illustrating microstructures of a capacitance formation region and a margin region having the same dielectric composition.
Figure 8A:
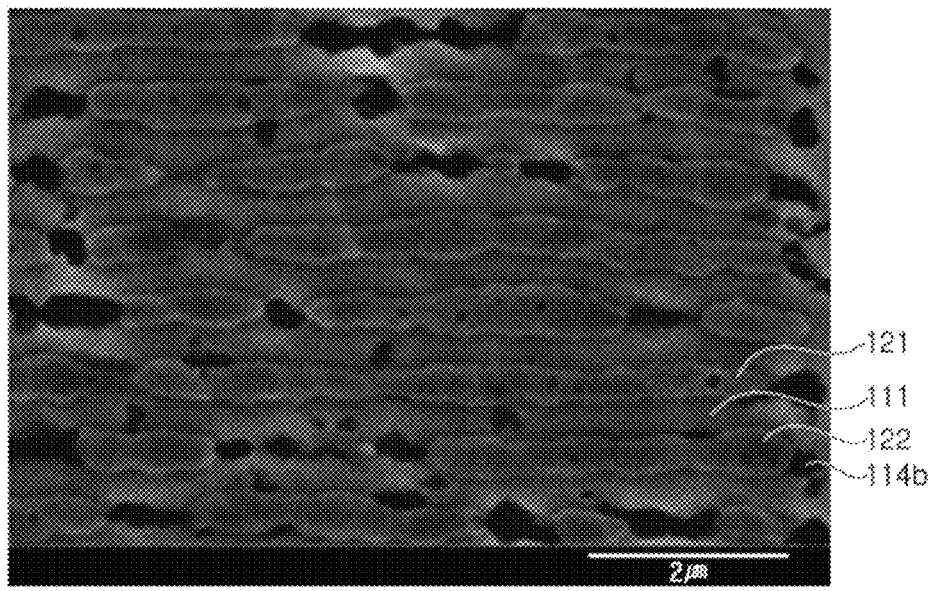
FIG. 8A is an image illustrating a microstructure between a capacitance formation region and a margin region of a multilayer capacitor according to an embodiment.
Figure 8B:
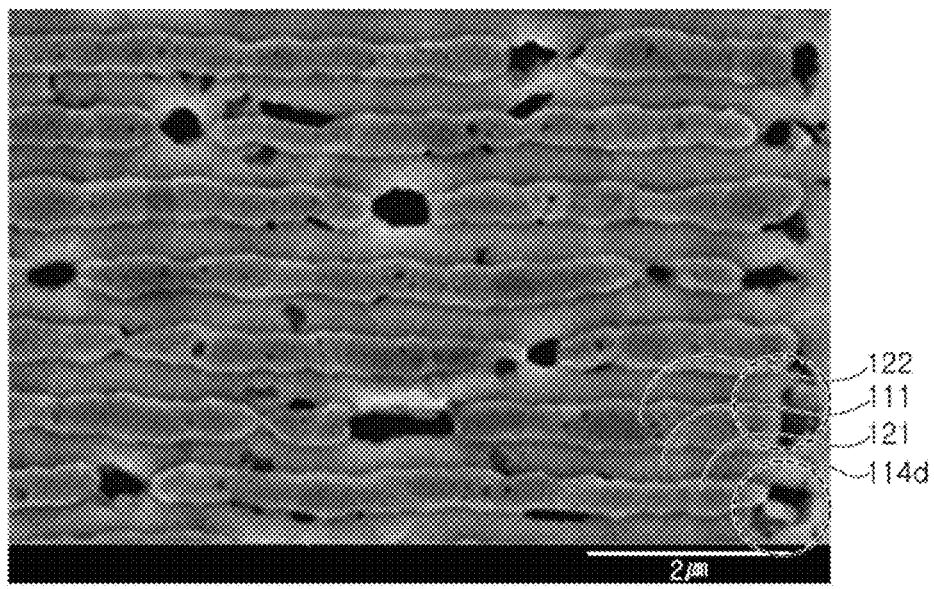
FIG. 8B is an image illustrating a microstructure between a capacitance formation region and a margin region having the same dielectric composition.

FIG. 7A is an image illustrating the microstructures of the capacitance formation region and the margin region of a multilayer capacitor according to an embodiment, and FIG. 7B is an image illustrating the microstructures of the capacitance formation region and the margin region having the same dielectric composition, FIG. 8A is an image illustrating the microstructure between the capacitance formation region and the margin region of a multilayer capacitor according to an embodiment, and FIG. 8B is an image illustrating the microstructure between the capacitance formation region and the margin region having the same dielectric composition.

The capacitance formation region 116 of the multilayer capacitor of FIGS. 7A and 8A may contain more rare earth elements (at least one selected from the group consisting of one or more elements among Dy, Tb, Y, Sm, Ho, Gd, Er, Ce, La and Nd) than those in the margin region 114. The rare earth element may be dysprosium (Dy), but is not limited thereto.

In the multilayer capacitor of FIGS. 7A and 8A, a molar content ratio of a first accessory component including the rare earth element with respect to a molar content of a second accessory component including at least one selected from the group consisting of one or more elements among tin (Sn), magnesium (Mg) and aluminum (Al) may be higher in the capacitance formation region 116 than in the margin region 114.

Accordingly, the margin region 114 of the multilayer capacitor of FIGS. 7A and 8A may have a structure in which an outer dielectric 114a and an inner dielectric 114b are relatively uniformly distributed, and the rod-shaped secondary phase and void frequency may also significantly decrease.

On the other hand, the margin region of the multilayer capacitor of FIGS. 7B and 8B may include relatively large numbers of outer rod-shaped secondary phases 114c and inner rod-shaped secondary phases 114d compared to those of the multilayer capacitor of FIGS. 7A and 8A, and may have a structure in which the dielectric is more non-uniformly distributed compared to the multilayer capacitor of FIGS. 7A and 8A.

When a glass component is added to the margin region 114, the glass may be concentrated in a specific portion of the margin region 114 (e.g., a portion adjacent to the capacitance formation region 116), which may be a factor that promotes the formation of the outer/inner rod-shaped secondary phases 114c and 114d, and the frequency difference between the outer/inner rod-shaped secondary phases 114c and 114d between the multilayer capacitors of FIGS. 7A and 8A and the multilayer capacitors of FIGS. 7B and 8B may be further increased.

The outer rod-shaped secondary phase 114c and the inner rod-shaped secondary phase 114d may cause an electric field concentration phenomenon, and the electric field concentration phenomenon may be a factor of a decrease in withstand voltage. Accordingly, as the frequency of the outer rod-shaped secondary phase 114c and the inner rod-shaped secondary phase 114d decreases, the withstand voltage may be improved.

As a result, the multilayer capacitor according to an embodiment of the present disclosure may be configured, such that the margin region 114 contains a relatively small molar content of rare earth element (or does not contain the same), where the rare earth element is at least one selected from the group consisting of one or more elements among Dy, Tb, Y, Sm, Ho, Gd, Er, Ce, La and Nd, or such that the margin region 114 has a relatively low molar content ratio (including zero) of the first accessory component including the rare earth element with respect to the molar content of the second accessory component (Sn, Mg, Al). Therefore, the electric field concentration phenomenon may be reduced due to the relatively non-grain growth characteristics of the margin region 114, and the withstand voltage may be improved.

Since the non-grain growth characteristics may depend on the molar content of dysprosium (Dy), the capacitance formation region 116 may contain more dysprosium (Dy) than that of the margin region 114.

Table 1 below illustrates the breakdown voltage (BDV) according to the molar ratio of dysprosium (Dy), which is one of the first accessory components, and the second accessory component (Sn, Mg, Al).

TABLE 1

| | Active Dy/(Sn + Dy + Mg + Al) [mol %] | Margin Dy/(Sn + Dy + Mg + Al) [mol %] | BDV [V] | BDV |
|---|---|---|---|---|
| 1 | 0.51 | 0.18 | 32 | NG |
| 2 | 0.43 | 0.52 | 20 | NG |
| 3 | 0.43 | 0.31 | 24 | NG |
| 4 | 0.43 | 0.26 | 30 | NG |

TABLE 1-continued

| | Active Dy/(Sn + Dy + Mg + Al) [mol %] | Margin Dy/(Sn + Dy + Mg + Al) [mol %] | BDV [V] | BDV |
|---|---|---|---|---|
| 5 | 0.43 | 0.18 | 45 | OK |
| 6 | 0.43 | 0.14 | 28 | NG |
| 7 | 0.31 | 0.18 | 22 | NG |
| 8 | 0.24 | 0.18 | 20 | NG |

Referring to Table 1, the ratio of the molar content of dysprosium (Dy) to the molar content of the second accessory component (Sn, Mg, Al) may be 0.4 or more and 0.5 or less in the capacitance formation region (Active), and may be 0.15 or more and 0.25 or less in the margin region (Margin). Accordingly, since the breakdown voltage BDV may be improved, the withstand voltage may be improved.

The ratio of the molar content of dysprosium (Dy) to the molar content of the second accessory component (Sn, Mg, Al) may be higher by 0.4/0.25 times or more and 0.5/0.15 times or less in the capacitance formation region (Active) than in the margin region (Margin). Accordingly, since the breakdown voltage BDV may be improved, the withstand voltage may be improved.

On the other hand, tin (Sn) may be solid-solubilized by substituting Ti, a portion the $BaTiO_3$-based main component. The margin region 114 contains a relatively large molar content of tin (Sn), and may thus have a relatively high toughness, may have reduced crack occurrence, and may have a higher density. Since the molar content of tin (Sn) in the capacitance formation region 116 may be relatively low (including zero), the capacitance formation region 116 may have a larger capacitance. For example, the margin region 114 may contain more tin (Sn) than that of the capacitance formation region 116.

Characteristics (such as toughness, density, capacitance and the like) that may be related to the difference in tin (Sn) molar content between the margin region 114 and the capacitance formation region 116 may be more diverse than characteristics (such as frequency of electric field concentration and the like) that may be related to the difference in the dysprosium (Dy) molar content between the margin region 114 and the capacitance formation region 116, and thus, the difference in the molar content of tin (Sn) between the margin region 114 and the capacitance formation region 116 may be greater than the molar content in dysprosium (Dy) between the margin region 114 and the capacitance formation region 116. Accordingly, the total molar content of tin (Sn) and dysprosium (Dy) may be greater in the margin region (Margin) than in the capacitance formation region (Active).

On the other hand, the total molar content of magnesium (Mg) and aluminum (Al) may be greater in the margin region (Margin) than in the capacitance formation region (Active). Accordingly, since the density of the margin region 114 may be further improved, the margin region may prevent external environmental factors (e.g., moisture, plating solution, foreign material) from penetrating into the capacitance formation region (Active) through the surface, and the reliability and lifespan of the multilayer capacitor may be improved.

Table 2 below illustrates the breakdown voltage (BDV), based on the ratio of the total molar content of tin (Sn) and dysprosium (Dy) in the capacitance formation region (Active) and the total molar content thereof in the margin region (Margin), and based on the ratio of the total molar content of magnesium (Mg) and aluminum (Al) in the capacitance formation region (Active) and the total molar content thereof in the margin region (Margin).

TABLE 2

| | Active/Margin Sn + Dy [mol %] | Active/Margin Mg + Al [mol %] | BDV [V] | BDV |
|---|---|---|---|---|
| 1 | 0.47 | 0.35 | 27 | NG |
| 2 | 0.47 | 0.48 | 33 | NG |
| 3 | 0.61 | 0.35 | 31 | NG |
| 4 | 0.61 | 0.48 | 45 | OK |
| 5 | 0.87 | 0.35 | 28 | NG |
| 6 | 0.87 | 0.48 | 30 | NG |

Referring to Table 2, the total molar content of tin (Sn) and dysprosium (Dy) may be greater by 100/65 times or more and 100/55 times or less in the margin region (Margin) than in the capacitance formation region (Active). The total molar content of magnesium (Mg) and aluminum (Al) may be 100/50 times or more and 100/45 times or less in the margin region (Margin) greater than in the capacitance formation region (Active). Accordingly, since the breakdown voltage BDV may be improved, the withstand voltage may be improved.

Figure 9A:
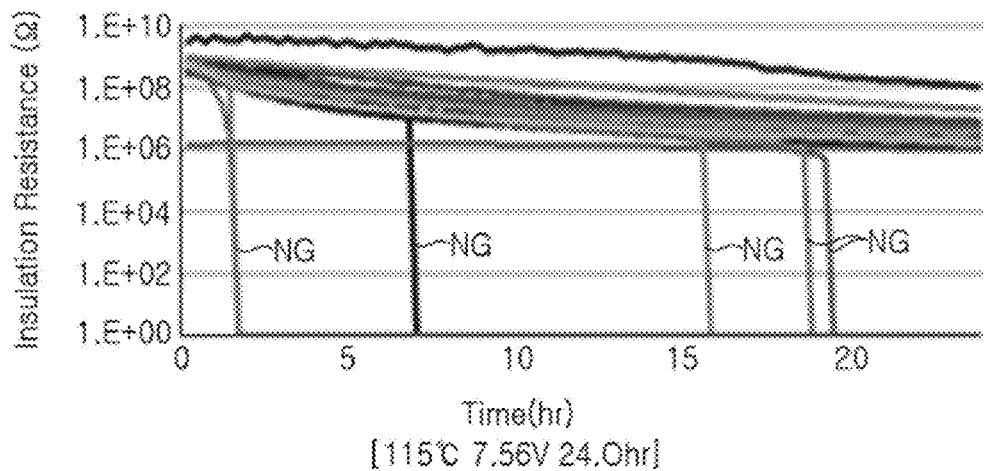
FIG. 9A is a graph illustrating reliability of a multilayer capacitor according to an embodiment.
Figure 9B:
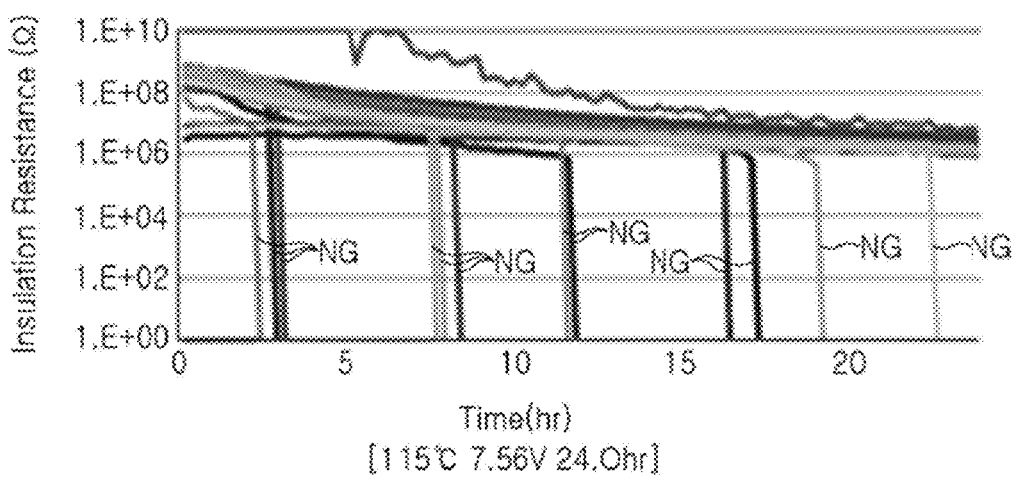
FIG. 9B is a graph illustrating reliability of a multilayer capacitor in which the capacitance formation region and the margin region have the same dielectric composition.

FIG. 9A is a graph illustrating reliability of a multilayer capacitor according to an embodiment, and FIG. 9B is a graph illustrating reliability of a multilayer capacitor in which the capacitance formation region and the margin region have the same dielectric composition.

Referring to FIG. 9A, the reliability of the multilayer capacitor according to an embodiment may be measured by the frequency of occurrence of a phenomenon (NG) in which insulation resistance is rapidly lowered when subjected to harsh environments (e.g., 7.56V is applied at a temperature of 115 degrees Celsius) for a predetermined period of time (e.g., 48 hours).

Since the frequency of NG of FIG. 9A may be lower than the frequency of NG of FIG. 9B, the multilayer capacitor according to an embodiment of the present disclosure may have higher reliability.

Figure 10A:
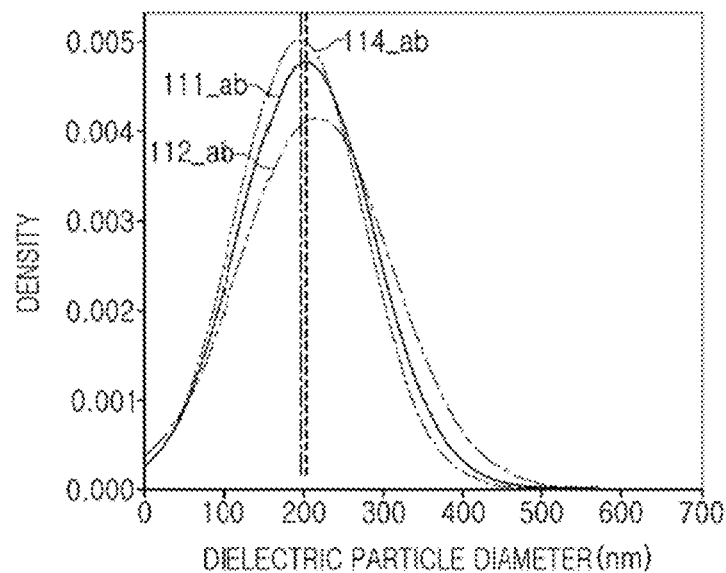
FIG. 10A is a graph illustrating a distribution of dielectric particle diameters in each region of a multilayer capacitor according to an embodiment.
Figure 10B:
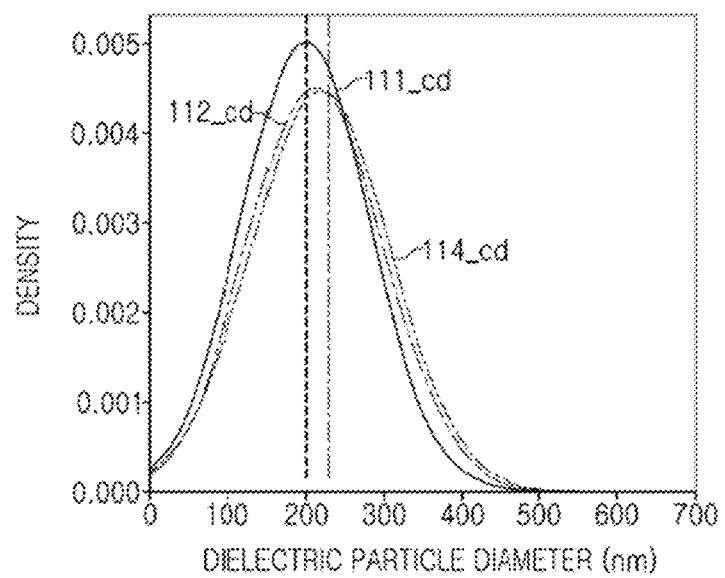
FIG. 10B is a graph illustrating a distribution of dielectric particle diameters in each region of the multilayer capacitor in which the capacitance formation region and the margin region have the same dielectric composition.

FIG. 10A is a graph illustrating the distribution of dielectric particle diameters in each region of the multilayer capacitor according to an embodiment, and FIG. 10B is a graph illustrating the distribution of dielectric particle diameters in each region of the multilayer capacitor in which the capacitance formation region and the margin region have the same dielectric composition.

Referring to FIG. 10A, a difference between the average of a dielectric particle size distribution 111_ab of the dielectric layer and the average of a dielectric particle size distribution 114_ab of the margin region may be relatively small. A difference between the average of a dielectric particle size distribution 112_ab of the cover layer and the average of the dielectric particle size distribution 114_ab of the margin region may be relatively great.

Referring to FIG. 10B, a difference between the average of a dielectric particle size distribution 111_cd of the dielectric layer and the average of a dielectric particle size distribution 114_cd of the margin region may be relatively great. A difference between the average of a dielectric particle size distribution 112_cd of the cover layer and the average of the dielectric particle size distribution 114_cd of the margin region may be relatively small.

On the other hand, in the margin region, a region adjacent (e.g., within 2 μm) to the capacitance formation region may have the distribution of a relatively shorter particle diameter than that of an outer region due to factors such as additives (e.g., glass) or the like. For example, the left side of the average in the dielectric particle size distribution 114_*ab* of the margin region may include a relatively larger dielectric particle size of a region adjacent (e.g., within 2 μm) to the capacitance formation region.

Since the difference between the average of the dielectric particle size distribution 111_*ab* and the average of the dielectric particle size distribution 114_*ab* of the margin region may be relatively small, the grain size of the dielectric in the region adjacent (e.g., within 2 μm) to the capacitance formation region in the margin region may be shorter than the grain size of the dielectric in the capacitance formation region.

For example, the grain size of the dielectric may be measured as a value obtained by dividing the sum of the longest axis and the shortest axis of the dielectric by 2, and may be measured using an image analysis program (e.g., SigmaScan by Jandel Scientific). In addition, when measuring the grain size, it is not necessary to measure the grain size of all dielectrics in the margin region or the capacitance formation region, and the grain size of a specific portion (e.g., a range of several μm on the center of the capacitance formation region, a range of several μm at a boundary portion between the capacitance formation region and the cover layer, a range of several μm of the boundary surface between the capacitance formation region and the margin region) may only be measured. The number of multilayer capacitors used in the measurement does not need to be too large, and only a few (e.g., 6) samples may be used.

As set forth above, a multilayer capacitor according to an embodiment may have a relatively high withstand voltage.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
    a body including a laminate structure in which at least one first internal electrode and at least one second internal electrode are alternately stacked in a first direction with at least one dielectric layer interposed therebetween; and
    first and second external electrodes spaced apart from each other and disposed on the body, to be connected to the at least one first internal electrode and the at least one second internal electrode, respectively,
    wherein the body includes:
        in a larger molar content, at least one selected from the group consisting of one or more of Dy, Tb, Y, Sm, Ho, Gd, Er, Ce, La and Nd in a capacitance formation region including a region between the at least one first internal electrode and the at least one second internal electrode than in a margin region including a region between a boundary line of the at least one first internal electrode and the at least one second internal electrode and a surface of the body, and
        tin (Sn), magnesium (Mg), and aluminum (Al) in both the capacitance formation region and the margin region, and
    wherein a total molar content of magnesium (Mg) and aluminum (Al) is greater in the margin region than in the capacitance formation region.

2. The multilayer capacitor of claim 1, wherein the body further comprises a $BaTiO_3$-based main component, and
    wherein in the body, a grain size of a dielectric in a region within 2 um from between the capacitance formation region and the margin region toward the surface of the body is shorter than a grain size of a dielectric in the capacitance formation region.

3. The multilayer capacitor of claim 1, wherein the body comprises more dysprosium (Dy) in the capacitance formation region than in the margin region.

4. The multilayer capacitor of claim 3, wherein the body comprises more tin (Sn) in the margin region than in the capacitance formation region.

5. The multilayer capacitor of claim 1,
    wherein a sum of a molar content of at least one selected from the group consisting of one or more of Dy, Tb, Y, Sm, Ho, Gd, Er, Ce, La and Nd and a molar content of tin (Sn) is greater in the margin region than in the capacitance formation region.

6. The multilayer capacitor of claim 5, wherein the body comprises dysprosium (Dy), and
    wherein a sum of a molar content of dysprosium (Dy) and a molar content of tin (Sn) is greater by 100/65 times or more and 100/55 times or less in the margin region than in the capacitance formation region.

7. The multilayer capacitor of claim 1, wherein the total molar content of magnesium (Mg) and aluminum (Al) is greater by 100/50 times or more and 100/45 times or less in the margin region than in the capacitance formation region.

8. The multilayer capacitor of claim 1, wherein tin (Sn), magnesium (Mg), and aluminum (Al) constitute a second accessory component,
    the at least one selected from the group consisting of one or more of Dy, Tb, Y, Sm, Ho, Gd, Er, Ce, La and Nd is a first accessory component, and
    a ratio of a molar content of the first accessory component to a molar content of the second accessory component is higher in the capacitance formation region than in the margin region.

9. The multilayer capacitor of claim 8, wherein the first accessory component includes Dy.

10. A multilayer capacitor comprising:
    a body including a laminate structure in which at least one first internal electrode and at least one second internal electrode are alternately stacked in a first direction with at least one dielectric layer interposed therebetween; and
    first and second external electrodes spaced apart from each other and disposed on the body, to be connected to the at least one first internal electrode and the at least one second internal electrode, respectively,
    wherein the body includes:
        a first accessory component including dysprosium (Dy), and
        a second accessory component including at least one selected from the group consisting of one or more of tin (Sn), magnesium (Mg) and aluminum (Al), a ratio of a molar content of the first accessory component to a molar content of the second accessory component is higher in a capacitance formation region including a region between the at least one first internal electrode and the at least one second internal electrode than in a margin region including a region between a boundary line of the at least one first internal electrode and the at least one second internal electrode and a surface of the body, and a ratio of a molar content of dysprosium (Dy) to a molar content of the second accessory component is higher by 1.6 times or more and 10/3 times or less in the capacitance formation region than in the margin region.

11. The multilayer capacitor of claim 10, wherein the ratio of the molar content of dysprosium (Dy) to the molar content of the second accessory component is 0.4 or more and 0.5 or less in the capacitance formation region, and is 0.15 or more and 0.25 or less in the margin region.

12. The multilayer capacitor of claim 11, wherein a total molar content of magnesium (Mg) and aluminum (Al) is greater by 100/50 times or more and 100/45 times or less in the margin region than in the capacitance formation region.

13. The multilayer capacitor of claim 10, wherein a total molar content of magnesium (Mg) and aluminum (Al) is greater in the margin region than in the capacitance formation region.

14. The multilayer capacitor of claim 13, wherein the total molar content of magnesium (Mg) and aluminum (Al) is greater by 100/50 times or more and 100/45 times or less in the margin region than in the capacitance formation region.

15. The multilayer capacitor of claim 10, wherein the body comprises tin (Sn), and wherein a sum of the molar content of the first accessory component and a molar content of tin (Sn) is greater in the margin region than in the capacitance formation region.

16. The multilayer capacitor of claim 15, wherein a sum of a molar content of dysprosium (Dy) and the molar content of tin (Sn) is greater by 100/65 times or more and 100/55 times or less in the margin region than in the capacitance formation region.

17. The multilayer capacitor of claim 10, wherein the body further comprises a $BaTiO_3$-based main component, and wherein in the body, a grain size of a dielectric in a region within 2 μm from between the capacitance formation region and the margin region toward the surface of the body is shorter than a grain size of a dielectric in the capacitance formation region.

18. The multilayer capacitor of claim 10, wherein the first accessory component further includes at least one selected from the group consisting of one or more of Tb, Y, Sm, Ho, Gd, Er, Ce, La and Nd.

19. A multilayer capacitor comprising:

a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively, wherein the body includes a first accessory component including dysprosium (Dy) and optionally at least one selected from the group consisting of one or more of Tb, Y, Sm, Ho, Gd, Er, Ce, La and Nd, and a second accessory component including tin (Sn), magnesium (Mg), and aluminum (Al), and a ratio of a molar content of dysprosium (Dy) to a molar content of the second accessory component is higher in a capacitance formation region including a region between the at least one first internal electrode and the at least one second internal electrode than in a margin region including a region between a boundary line of the at least one first internal electrode and the at least one second internal electrode and a surface of the body.

20. The multilayer capacitor of claim 19, wherein the ratio of the molar content of dysprosium (Dy) to the molar content of the second accessory component is 0.4 or more and 0.5 or less in the capacitance formation region.

21. The multilayer capacitor of claim 20, wherein the ratio of the molar content of dysprosium (Dy) to the molar content of the second accessory component is 0.15 or more and 0.25 or less in the margin region.

22. The multilayer capacitor of claim 19, wherein the second accessory component consists of tin (Sn), magnesium (Mg), and aluminum (Al).

23. A multilayer capacitor comprising:

a body including a laminate structure in which at least one first internal electrode and at least one second internal electrode are alternately stacked in a first direction with at least one dielectric layer interposed therebetween; and first and second external electrodes spaced apart from each other and disposed on the body, to be connected to the at least one first internal electrode and the at least one second internal electrode, respectively, wherein the body includes a first accessory component including dysprosium (Dy) and optionally at least one selected from the group consisting of one or more of Tb, Y, Sm, Ho, Gd, Er, Ce, La and Nd, and a second accessory component including tin (Sn), magnesium (Mg), and aluminum (Al), a total molar content of magnesium (Mg) and aluminum (Al) is greater in a margin region including a region between a boundary line of the at least one first internal electrode and the at least one second internal electrode and a surface of the body than in a capacitance formation region including a region between the at least one first internal electrode and the at least one second internal electrode, and a sum of a molar content of dysprosium (Dy) and the molar content of tin (Sn) is greater in the margin region than in the capacitance formation region.

24. The multilayer capacitor of claim 23, wherein the total molar content of magnesium (Mg) and aluminum (Al) is greater by 100/50 times or more and 100/45 times or less in the margin region than in the capacitance formation region.

25. The multilayer capacitor of claim 24, wherein the sum of the molar content of dysprosium (Dy) and the molar content of tin (Sn) is greater by 100/65 times or more and 100/55 times or less in the margin region than in the capacitance formation region.

26. The multilayer capacitor of claim 23, wherein the second accessory component consists of tin (Sn), magnesium (Mg), and aluminum (Al).

* * * * *